(12) United States Patent
Taylor et al.

(10) Patent No.: US 11,286,878 B2
(45) Date of Patent: Mar. 29, 2022

(54) VARIABLE AREA NOZZLE EXHAUST SYSTEM WITH INTEGRATED THRUST REVERSER

(71) Applicants: Rolls-Royce North American Technologies Inc., Indianapolis, IN (US); Rolls-Royce Corporation, Indianapolis, IN (US)

(72) Inventors: Todd S. Taylor, Bargersville, IN (US); David L. Sutterfield, Greenwood, IN (US); Jack D. Petty, Indianapolis, IN (US); Andrew Sanderson, Indianapolis, IN (US); Bryan H. Lerg, Carmel, IN (US)

(73) Assignees: Rolls-Royce North American Technologies Inc., Indianapolis, IN (US); Rolls-Royce Cornoration, Indianapolis, IN (US)

( * ) Notice: Subject to any disclaimer, the term of this patent is extended or adjusted under 35 U.S.C. 154(b) by 0 days.

(21) Appl. No.: 16/836,065

(22) Filed: Mar. 31, 2020

(65) Prior Publication Data

US 2021/0301761 A1    Sep. 30, 2021

(51) Int. Cl.
| | |
|---|---|
| *F02K 1/09* | (2006.01) |
| *F02K 1/38* | (2006.01) |
| *F02K 1/44* | (2006.01) |
| *F02K 1/62* | (2006.01) |
| *F02K 1/15* | (2006.01) |
| *F02K 1/58* | (2006.01) |
| *F02K 1/08* | (2006.01) |

(52) U.S. Cl.
CPC .............. *F02K 1/386* (2013.01); *F02K 1/08* (2013.01); *F02K 1/09* (2013.01); *F02K 1/15* (2013.01); *F02K 1/44* (2013.01); *F02K 1/58* (2013.01); *F02K 1/62* (2013.01)

(58) Field of Classification Search
CPC ..... F02K 1/00; F02K 1/06; F02K 1/09; F02K 1/56; F02K 1/62; F02K 1/625; F02K 1/70; F02K 1/72; B64D 2033/026
See application file for complete search history.

(56) References Cited

U.S. PATENT DOCUMENTS

| | | | |
|---|---|---|---|
| 2,971,327 A * | 2/1961 | Moy | ........................ F02K 1/12 239/265.17 |
| 3,829,020 A | 8/1974 | Stearns | |
| 4,295,611 A | 10/1981 | Wynosky et al. | |
| 4,802,629 A | 2/1989 | Klees | |
| 5,806,302 A | 9/1998 | Cariola et al. | |
| 7,174,704 B2 | 2/2007 | Renggli | |
| 8,459,036 B2 | 6/2013 | Baker | |
| 8,677,733 B2 | 3/2014 | Beardsley et al. | |
| 8,915,060 B2 | 12/2014 | Parham | |
| 9,181,899 B2 | 11/2015 | Dindar et al. | |
| 9,534,562 B2 | 1/2017 | Biset | |
| 9,970,387 B2 | 5/2018 | Frank et al. | |

(Continued)

*Primary Examiner* — Gerald L Sung
(74) *Attorney, Agent, or Firm* — Barnes & Thornburg LLP

(57) ABSTRACT

A propulsion unit includes a gas turbine engine arranged along an axis and an exhaust system coupled to the gas turbine engine. The gas turbine engine includes an engine core configured to discharge a core flow and a fan configured to be driven by the engine core to discharge a bypass flow. The exhaust system receives the mixed bypass and core flows from the gas turbine engine.

18 Claims, 6 Drawing Sheets

(56) References Cited

U.S. PATENT DOCUMENTS

| | | | |
|---|---|---|---|
| 10,174,716 B2 | 1/2019 | Kohlenberg et al. | |
| 10,400,621 B2 | 9/2019 | Sawyers-Abbott et al. | |
| 10,724,472 B1* | 7/2020 | Chase | F02K 1/15 |
| 2009/0288386 A1* | 11/2009 | Marshall | F02K 1/72 60/204 |
| 2010/0095650 A1 | 4/2010 | Schafer | |
| 2012/0192543 A1 | 8/2012 | Aeberli et al. | |
| 2016/0123178 A1* | 5/2016 | Tersmette | F02K 1/08 239/11 |
| 2018/0119639 A1 | 5/2018 | Wells | |
| 2021/0270206 A1* | 9/2021 | Sanderson | F02K 1/08 |

\* cited by examiner

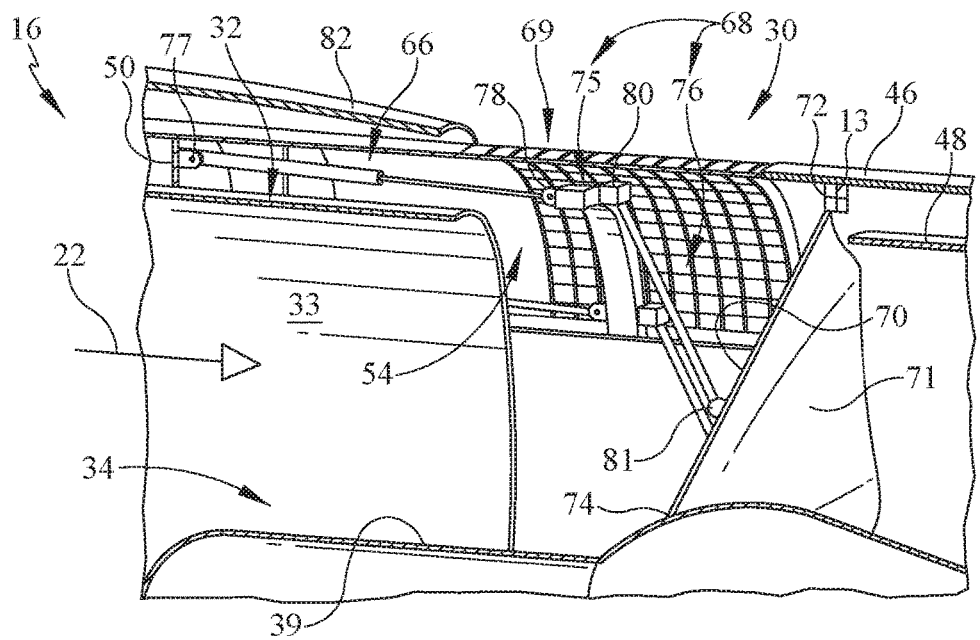
FIG. 7
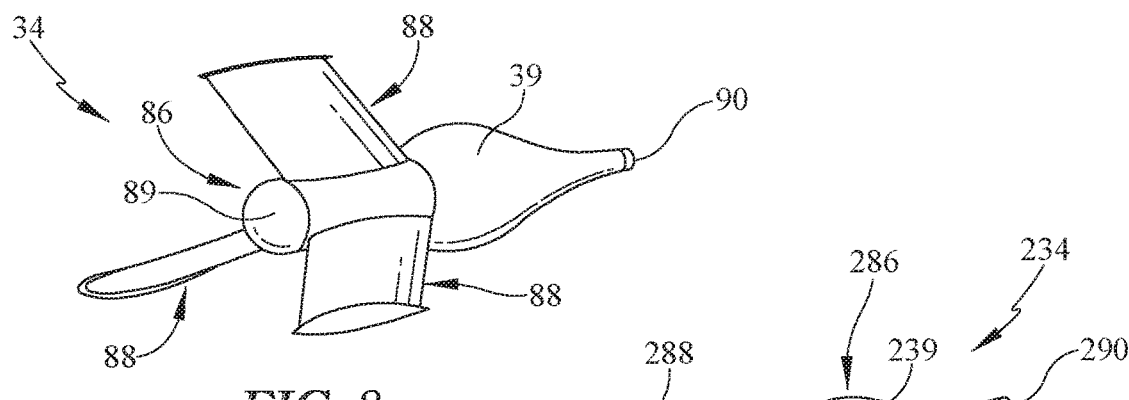
FIG. 8
FIG. 9
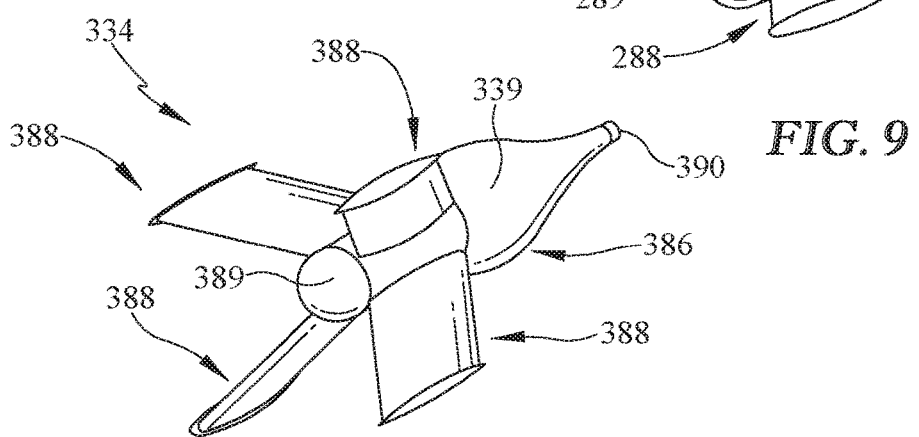
FIG. 10

VARIABLE AREA NOZZLE EXHAUST SYSTEM WITH INTEGRATED THRUST REVERSER

FIELD OF THE DISCLOSURE

The present disclosure relates generally to gas turbine engines, and more specifically to exhaust nozzles for gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Exhaust nozzles can have size and shape to optimize engine operation. A larger exhaust nozzle area can reduce velocity of the exhaust air and lower noise emissions of the engine. The shape of the exhaust nozzle can optimize the exhaust flow exiting the engine to increase engine efficiency and improve thrust. In some applications, the exhaust nozzle mixes the hot exhaust air from the turbine with cooler by-pass duct air.

Subsonic exhaust nozzles typically have a convergent shape, which causes expansion of the gases to atmospheric pressure downstream of the exhaust nozzle when choked. This creates some thrust from the imbalance of the static pressure at the throat of the exhaust and the atmospheric pressure. Supersonic exhausts may have a convergent-divergent shape to generate supersonic flow of the exhaust gases. The convergent section of the exhaust nozzle may be sized to choke the flow so that the flow is sonic at the throat. The divergent section of the exhaust nozzle may allow further expansion of the gases inside the nozzle and accelerates the flow to supersonic.

SUMMARY

The present disclosure may comprise one or more of the following features and combinations thereof.

A propulsion unit for an aircraft may include a gas turbine engine and an exhaust system. The gas turbine engine may be arranged along an axis. The engine may include an engine core configured to discharge a core flow and a fan configured to discharge a bypass flow. The exhaust system may be coupled to the gas turbine engine to receive mixed bypass and core flows from the gas turbine engine.

In some embodiments, the exhaust system may include a static exhaust system, a noise management structure, and a thrust reverser unit. The static exhaust system structure may be fixed relative to the gas turbine engine. The noise management structure may include a moveable exhaust outlet that is mounted for movement along the axis.

In some embodiments, the static exhaust system structure may include a jet pipe and an inner plug. The jet pipe may be arranged around the axis to provide a first portion of an outer boundary surface of a primary exhaust system flow path. The inner plug may define an inner boundary surface of the primary exhaust system flow path. The moveable exhaust outlet may provide a second portion of the outer boundary surface of the primary exhaust system flow path.

In some embodiments, the noise management structure may be configured to axially translate relative to the static exhaust system structure between a slid-aft take-off position, a slid-aft thrust-reverse position, and a slid-forward cruise position to provide a reconfigurable exhaust nozzle. The reconfigurable exhaust nozzle may adjust a variable nozzle throat area of the exhaust system to control noise produced by the gas turbine engine during operation of the gas turbine engine.

In some embodiments, the thrust reverser unit may include a plurality of blocker doors. The plurality of blocker doors may be configured to pivot relative to the jet pipe about a pivot axis between a stored arrangement and a thrust-reversing arrangement. In the stored arrangement, the plurality of blocker doors may be located within the jet pipe and do not block flow along the primary exhaust system flow path. In thrust-reversing arrangement, each blocker door may block at least some flow along the primary exhaust system flow path so as to direct at least some flow out of the primary exhaust system flow path and create reverse thrust.

In some embodiments, the slid-aft thrust-reverse position may be axially aft of the slid-aft take-off position such that at least one aperture formed in the moveable exhaust outlet is exposed to the primary exhaust system flow path. The aperture may be exposed to the primary exhaust system flow path to allow the at least some flow to be directed out of the primary exhaust system flow path by the plurality of blocker doors when the plurality of blocker doors are in the thrust-reversing arrangement.

In some embodiments, the slid-aft take-off position of the moveable exhaust outlet may provide a maximum nozzle throat area between the outer boundary surface of the jet pipe and the inner boundary surface of the inner plug. In some embodiments, the slid-forward cruise position of the moveable exhaust outlet may provide a minimum nozzle throat area between the outer boundary surface of the jet pipe and the inner boundary surface of the inner plug. The minimum nozzle throat area may be less than the maximum nozzle throat area.

In some embodiments, the moveable exhaust outlet may be configured to translate axially between a plurality of positions. The plurality of positions may be between the slid-aft take-off position and the slid-forward cruise position.

In some embodiments, the noise management structure may further include a plurality of actuator units. The plurality of actuator units may be arranged to extend between the jet pipe of the static exhaust system structure and the moveable exhaust outlet to drive the moveable exhaust outlet between the slid-aft take-off position, the slid-aft thrust-reverse position, and the slid-forward cruise position.

In some embodiments, the thrust reverser unit may further include at least one actuator and a linkage system. The actuator may be configured to drive the plurality of blocker doors between the stored arrangement and the thrust-reversing arrangement. The linkage system may be arranged to extend between and interconnect the at least one actuator to the plurality of blocker doors.

In some embodiments, the moveable exhaust outlet may be shaped to include at least one aperture. The aperture may extend at least circumferentially partway about the axis. The aperture may be open to the primary exhaust system flow path when the moveable exhaust outlet is in the slid-aft thrust-reverse position so as to allow the at least some flow to be directed out of the primary exhaust system flow path by the plurality of blocker doors when the plurality of blocker doors are in the thrust-reversing arrangement.

In some embodiments, the thrust reverser unit may further include a cascade structure. The cascade may be arranged in the at least one aperture of the moveable exhaust outlet. The cascade may be configured to direct the at least some flow directed out of the primary exhaust system flow path by the plurality of blocker doors axially forward to provide reverse thrust.

In some embodiments, the plurality of blocker doors may have a corresponding shape to the inner boundary surface of the inner plug at a location radially inward of the plurality of blocker doors when the inner plug in the slid-aft thrust-reverse position and the plurality of blocker doors are in the thrust-reversing arrangement.

According to another aspect of the present disclosure, an exhaust system adapted for use with a gas turbine engine may include a static exhaust system structure, a noise management structure, and a thrust reversing unit. The static exhaust system structure may define a primary exhaust system flow path of the exhaust system. The noise management structure may include a moveable exhaust outlet that is mounted for movement along the axis. The thrust reverser unit may include a plurality of blocker doors.

In some embodiments, the static exhaust system structure may include a jet pipe and an inner plug. The jet pipe may be arranged around an axis to provide an outer boundary surface of the primary exhaust system flow path. The inner plug may define an inner boundary surface of the primary exhaust system flow path. The moveable exhaust nozzle may provide a portion of the outer boundary surface of the primary exhaust system flow path.

In some embodiments, the noise management structure may be configured to axially translate relative to the static exhaust system structure between a slid-aft take-off position, a slid-aft thrust-reverse position, and a slid-forward cruise position to provide a reconfigurable exhaust nozzle. The reconfigurable exhaust nozzle may adjust a variable nozzle throat area of the exhaust system to vary noise produced by the gas turbine engine during operation of the gas turbine engine.

In some embodiments, the plurality of blocker doors may be configured to pivot relative to the jet pipe about a pivot axis between a closed position and an open position. In the closed position, the plurality of blocker doors may be located within an aperture formed in the moveable exhaust outlet to close the aperture formed in the moveable exhaust outlet. In the open position, each blocker door may extend into the primary exhaust system flow path and block at least some flow along the primary exhaust system flow path so as to direct at least some flow out of the primary exhaust system flow path through the aperture formed in the moveable exhaust outlet and create reverse thrust.

In some embodiments, the slid-aft thrust-reverse position may be axially aft of the slid-aft take-off position such that the aperture formed in the moveable exhaust outlet is exposed to the primary exhaust system flow path. The aperture formed in the moveable exhaust outlet may be exposed to the primary exhaust system flow path to allow the at least some flow to be directed out of the primary exhaust system flow path by the plurality of blocker doors.

In some embodiments, the slid-aft take-off position of the moveable exhaust outlet may provide a maximum nozzle throat area between the outer boundary surface of the jet pipe and the inner boundary surface of the inner plug. In some embodiments, the slid-forward cruise position of the moveable exhaust outlet may provide a minimum nozzle throat area between the outer boundary surface of the jet pipe and the inner boundary surface of the inner plug. The minimum nozzle throat area may be less than the maximum nozzle throat area.

In some embodiments, the noise management structure may further include a plurality of actuator units. The plurality of actuator units may be arranged to extend between the jet pipe of the static exhaust system structure and the moveable exhaust outlet to drive the moveable exhaust outlet between the slid-aft take-off position, the slid-aft thrust-reverse position, and the slid-forward cruise position.

In some embodiments, the thrust reverser unit may further include at least one actuator and a linkage system. The actuator may be configured to drive the plurality of blocker doors between the closed position and the open position. The linkage system may be arranged to extend between and interconnect the at least one actuator to the plurality of blocker doors.

In some embodiments, the moveable exhaust outlet may be shaped to include at least one aperture. The aperture may extend at least circumferentially partway about the axis. The aperture may be open to the primary exhaust system flow path when the moveable exhaust outlet is in the slid-aft thrust-reverse position so as to allow the at least some flow to be directed out of the primary exhaust system flow path by the plurality of blocker doors when the plurality of blocker doors are in the open position.

In some embodiments, the thrust reverser unit may further include a cascade structure. The cascade structure may be arranged in the at least one aperture of the moveable exhaust outlet. The cascade structure may be configured to direct the at least some flow directed out of the primary exhaust system flow path by the plurality of blocker doors axially forward to provide reverse thrust.

According to another aspect of the present disclosure, a method may include several steps. The method may include providing an exhaust system for use with a gas turbine engine.

In some embodiments, the exhaust system may include a static exhaust flow structure, a noise management structure, and a thrust reverser unit. The static exhaust flow structure may define a primary exhaust flow path of the exhaust system. The noise management structure may include an exhaust outlet that is mounted for movement along an axis and may provide a portion of the primary exhaust system flow path. The thrust reverser unit may include a plurality of blocker doors configured to pivot relative to the static exhaust flow structure about a pivot axis. In some embodiments, the noise management structure may be configured to axially translate relative to the static exhaust flow structure to provide a reconfigurable exhaust nozzle.

In some embodiments, the method may further include directing the moveable exhaust outlet to translate axially along the axis relative to the static exhaust flow structure to a slid-aft take-off position. The slid-aft take-off position may provide a maximum nozzle throat area of the reconfigurable exhaust nozzle.

In some embodiments, the method may further include directing the moveable exhaust outlet to translate axially along the axis relative to the static exhaust flow structure to a slid-forward cruise position. The slid-forward cruise position may provide a minimum nozzle throat area of the reconfigurable exhaust nozzle.

In some embodiments, the method may further include directing the moveable exhaust outlet to translate axially along the axis relative to the static exhaust flow structure to a slid-aft thrust-reverse position and directing the plurality of blocker doors of the thrust reverser unit to move from a stored arrangement to a thrust-reversing arrangement. In the stored arrangement, the plurality of blocker doors may be located within an aperture formed in the static exhaust flow structure. In the thrust-reversing arrangement, each blocker door may block at least some flow along the primary exhaust system flow path so as to direct at least some flow out of the primary exhaust system flow path and create reverse thrust.

In some embodiments, the method may further include providing a controller. The controller may be coupled to the exhaust system.

In some embodiments, the controller may be configured to direct the moveable exhaust outlet to translate axially along the axis to the slid-aft take-off position in response to a first input. In some embodiments, the controller may be configured to direct the moveable exhaust outlet to translate axially along the axis to the slid-forward cruise position in response to a second input. In some embodiments, the controller may be configured to direct the moveable exhaust outlet to translate axially along the axis to the slid-aft thrust-reverse position and the plurality of blocker doors to pivot about the axis to the thrust-reversing arrangement in response to a third input.

These and other features of the present disclosure will become more apparent from the following description of the illustrative embodiments.

BRIEF DESCRIPTION OF THE DRAWINGS

FIG. 7 is a detail view of the thrust reverser unit of FIG. 6 showing the thrust reverser unit includes a linkage system that moves the blocker doors between the stored arrangement and the thrust-reversing arrangement and a cascade structure that is configured to direct the at least some flow out of the exhaust system flow path axially forward to provide reverse thrust;

FIG. 8 is a perspective view of an inner plug included in the static exhaust system structure of the exhaust system of FIG. 3 showing the inner plug includes a plug body and at least three struts that extend radially outward from the plug body and couple to the jet pipe of the static exhaust system structure;

FIG. 9 is a perspective view of another embodiment of the inner plug adapted for use in the propulsion unit of FIG. 2 showing the inner plug includes a plug body and at least two struts that extend radially outward from the plug body and couple to the jet pipe of the static exhaust system structure; and FIG. 10 is a perspective view of another embodiment of the inner plug adapted for use in the propulsion unit of FIG. 2 showing the inner plug includes a plug body and at least four struts that extend radially outward from the plug body and couple to the jet pipe of the static exhaust system structure.

DETAILED DESCRIPTION OF THE DRAWINGS

Figure 1:
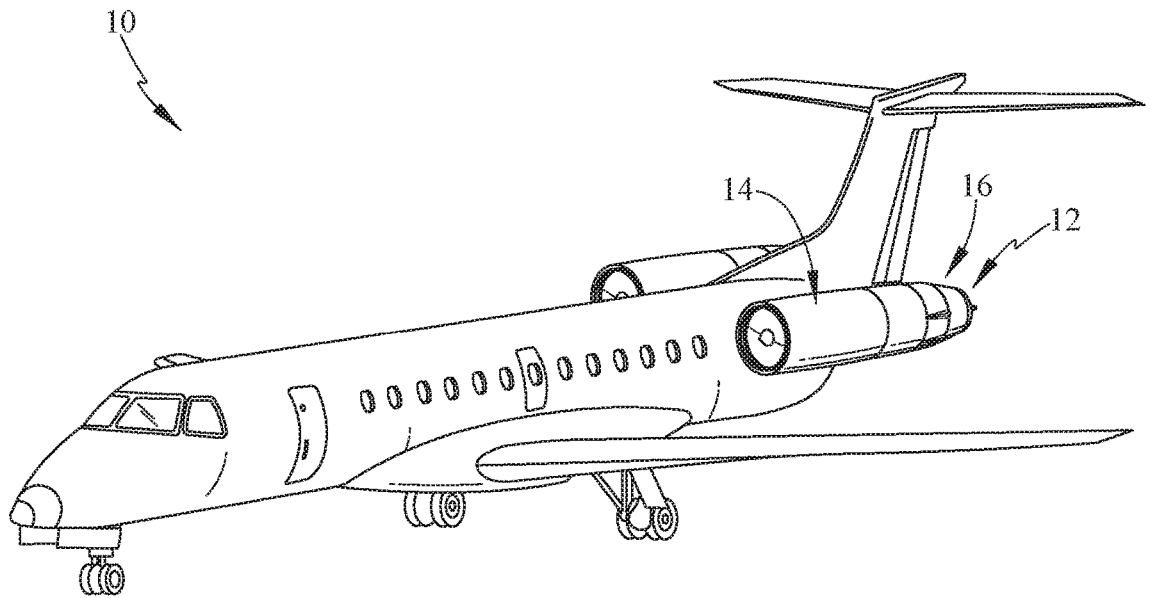
FIG. 1 is perspective view of an aircraft showing the aircraft includes an airframe and a propulsion unit having a gas turbine engine coupled to the airframe and an exhaust system coupled to the gas turbine engine to receive exhaust products from the gas turbine engine and direct the exhaust products to propel the airframe.

For the purposes of promoting an understanding of the principles of the disclosure, reference will now be made to a number of illustrative embodiments illustrated in the drawings and specific language will be used to describe the same.

Figure 2:
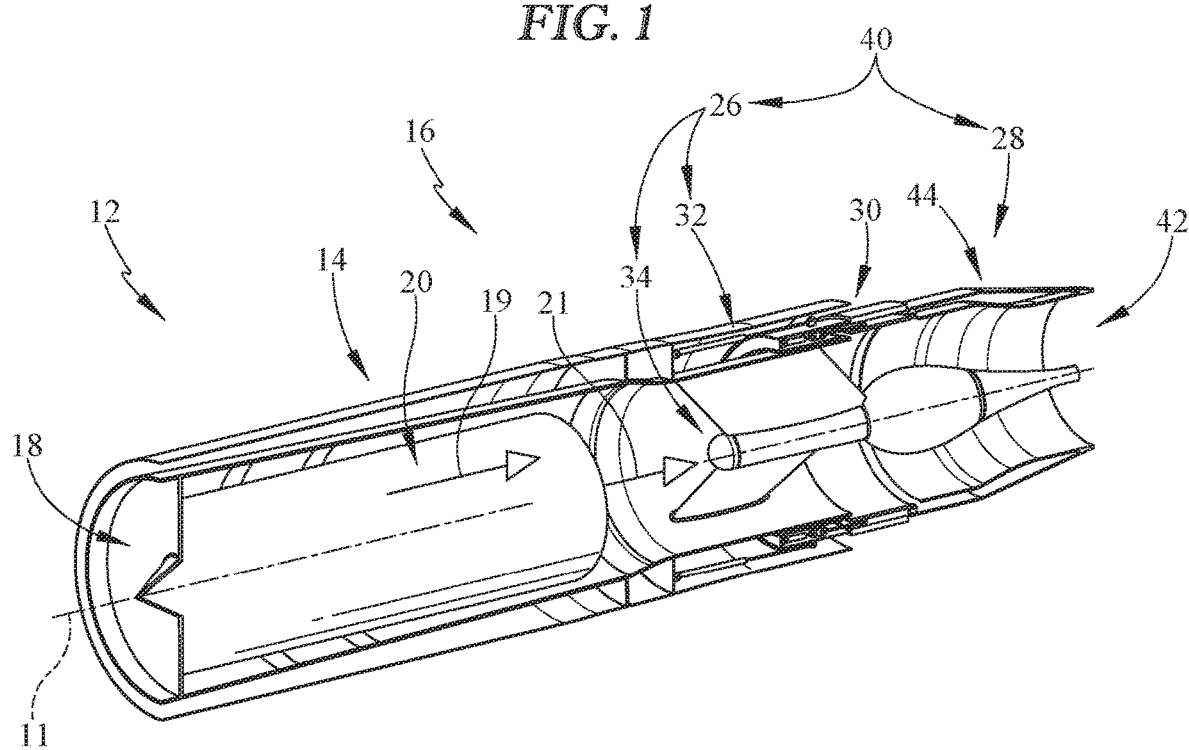
FIG. 2 is perspective view of the propulsion unit in the aircraft of FIG. 1 showing the engine includes an engine core configured to discharge a core flow and a fan configured to be driven by the engine core to discharge a bypass flow, and showing the exhaust system includes (i) a static exhaust system structure coupled to the gas turbine engine to receive the mixed core and bypass flows, (ii) a noise management structure mounted to the static exhaust system structure for movement along the axis between a slid-aft take-off position, a slid-aft thrust-reverse position, and a slid-forward cruise position to provide a reconfigurable exhaust nozzle that controls a variable nozzle throat area of the exhaust system, (iii) and a thrust reverser unit integrated into the reconfigurable exhaust nozzle that redirects the mixed exhaust products flowing through the reconfigurable exhaust nozzle to provide reverse thrust.

A propulsion unit 12 for an aircraft 10 according to the present disclosure includes a gas turbine engine 14 and an exhaust nozzle 16 coupled to the gas turbine engine 14 as shown in FIGS. 1 and 2. The gas turbine engine 14 includes a fan 18 and an engine core 20 having a compressor, a combustor, and a turbine arranged axially along an axis 11 as shown in FIG. 2. The engine core 20 is configured to discharge a core flow 21, while the fan 18 is configured to be driven by the engine core 20 to discharge a bypass flow 19 that provides thrust for propelling an aircraft 10. The exhaust system 16 is coupled to the gas turbine engine 14 so as to receive the bypass and core flows 19, 21 in a combined exhaust flow 22 from the gas turbine engine 14. The exhaust system 16 has a variable nozzle throat area 42 that can be changed to optimize the combined exhaust flow 22 for low noise emissions such as, for example, during take-off and landing, or for increased engine efficiency, for example, at cruise.

Figure 3:
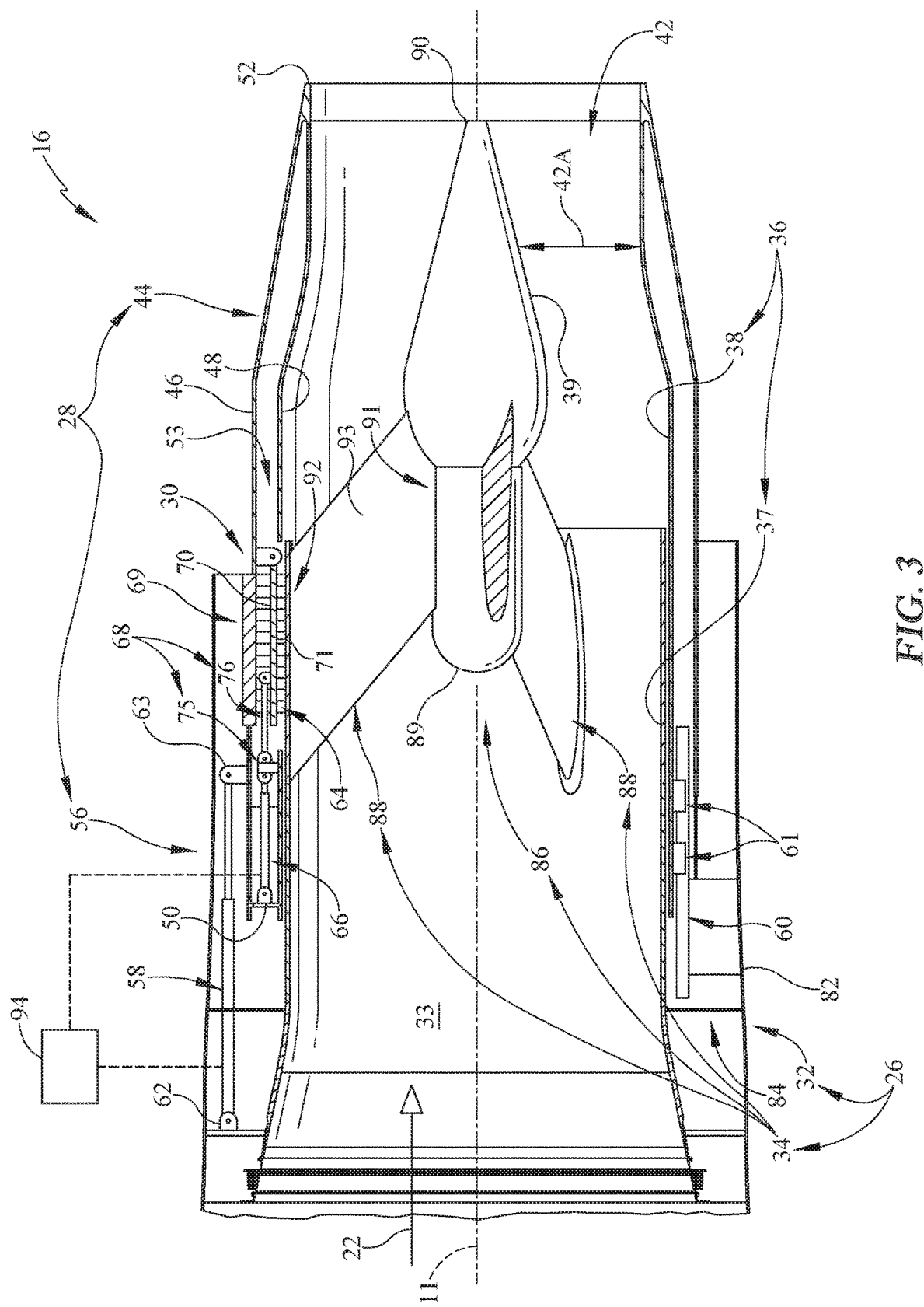
FIG. 3 is a cross-section view of the exhaust system of the propulsion unit of FIG. 2 showing the noise management structure in the slid-aft take-off position to provide a maximum nozzle throat area of the reconfigurable exhaust nozzle, and showing the thrust reverser unit in a stored arrangement in which blocker doors of the thrust reverser unit are stored in a jet pipe of the static exhaust system structure.
Figure 4:
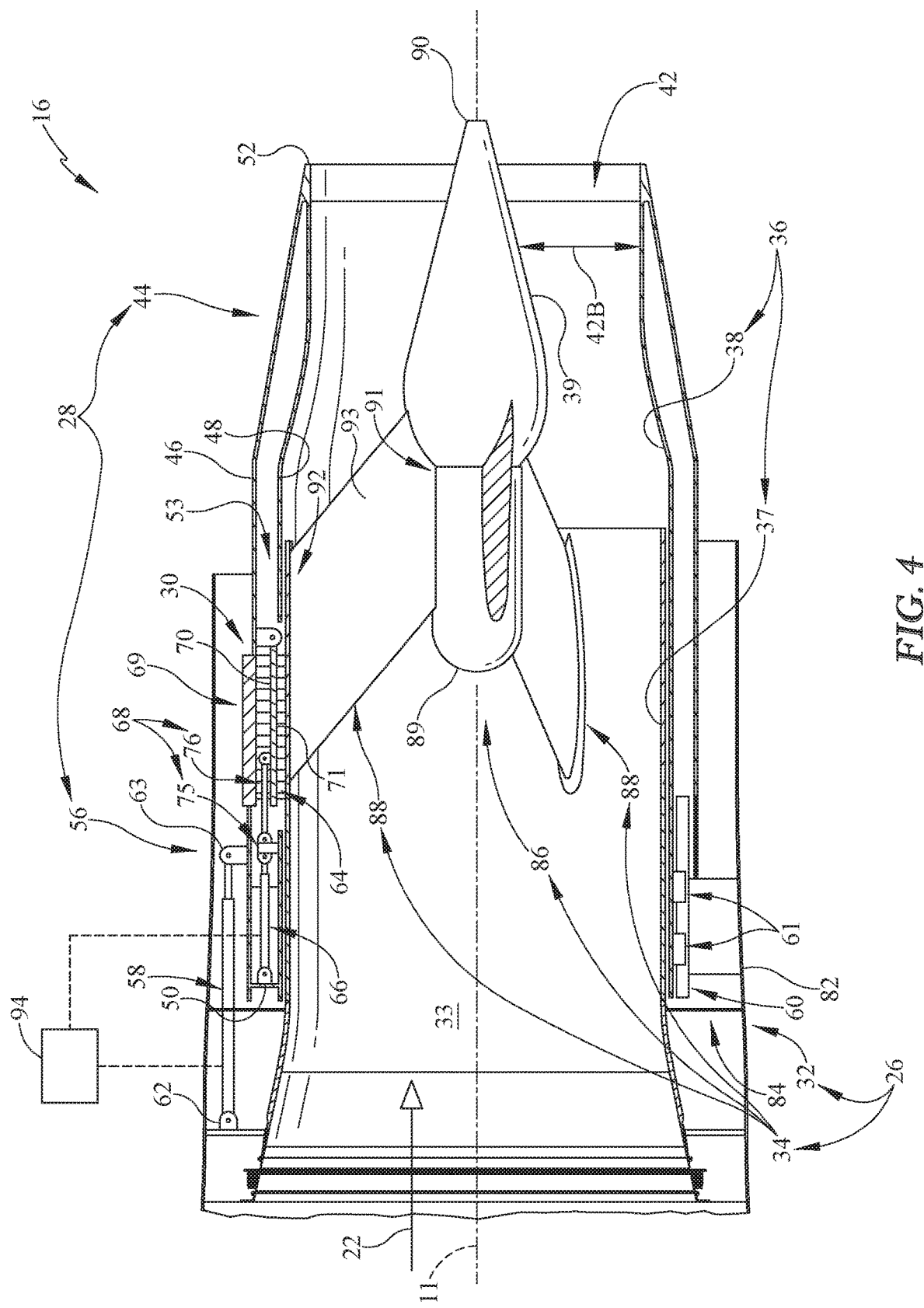
FIG. 4 is a cross-section view of the exhaust system of the propulsion unit of FIG. 2 showing the noise management structure translated axially forward to from the slid-aft take-off position to the slid-forward cruise position to provide a minimum nozzle throat area of the reconfigurable exhaust nozzle.
Figure 5:
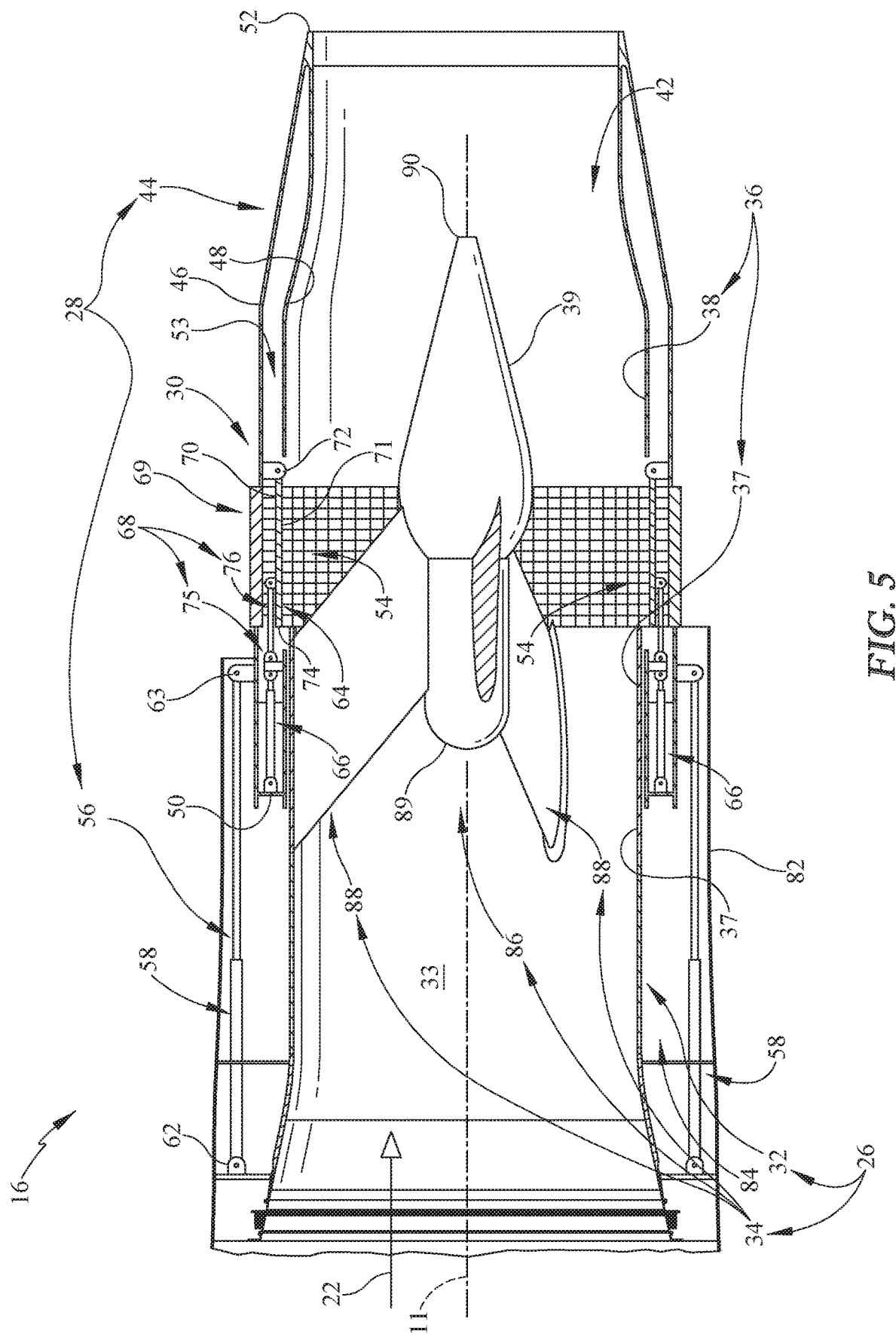
FIG. 5 is a cross-section view of the exhaust system of the propulsion unit of FIG. 2 showing the noise management structure translated axially aft from the slid-forward cruise position to the slid-aft thrust-reverser position to expose the blocker doors of the thrust reverser unit so that the blocker doors are free to change to a thrust-reversing arrangement.
Figure 6:
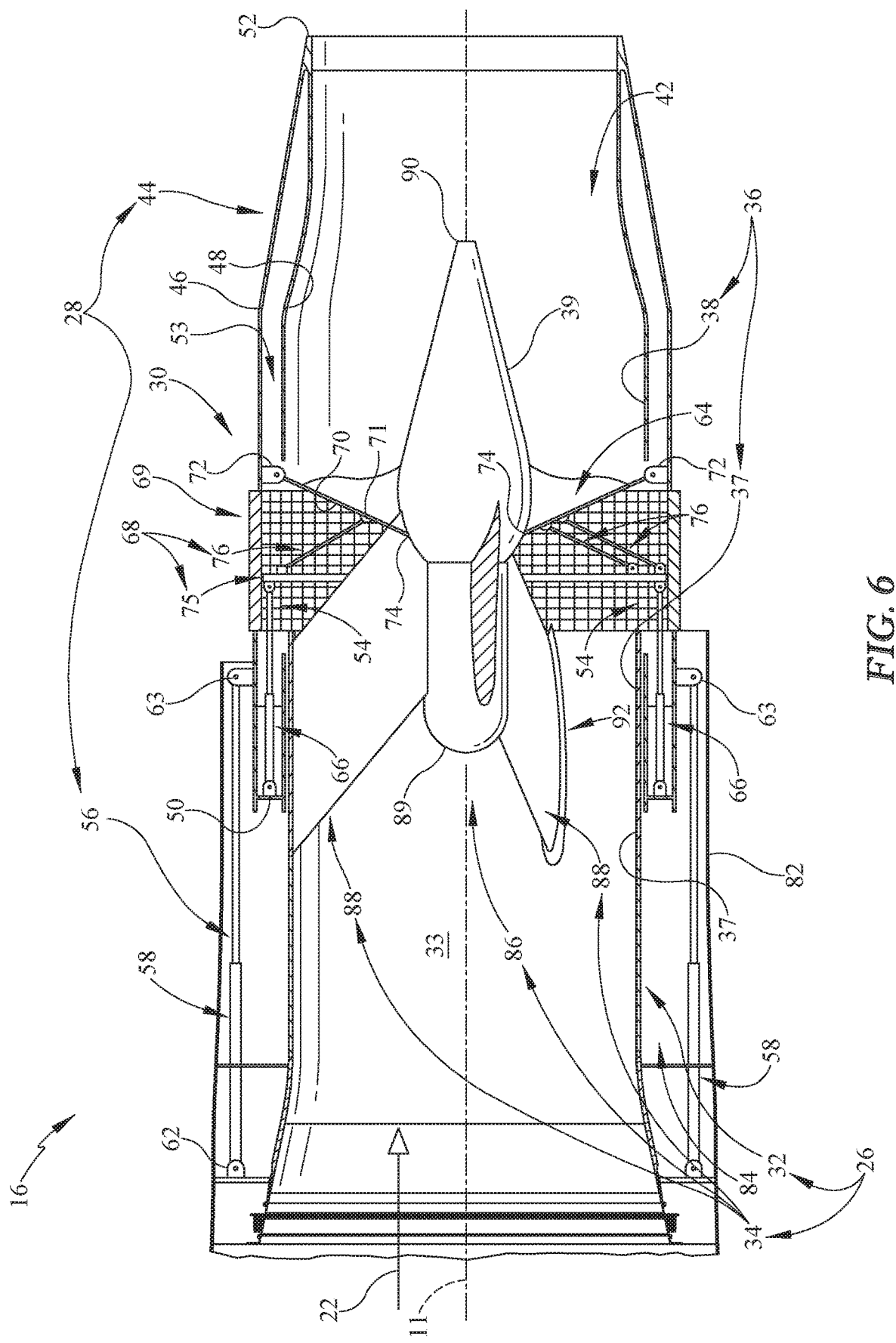
FIG. 6 is a cross-section view of the exhaust system of the propulsion unit of FIG. 2 showing the thrust reverser unit in the thrust-reversing arrangement in which the blocker doors have been deployed so that the blocker doors engage a plug included in the noise management structure to redirect at least some flow out of the primary exhaust system flow path.

The exhaust system 16 includes a static exhaust system structure 26, a noise management structure 28, and a thrust reverser unit 30 as shown FIGS. 2-7. The static exhaust system structure 26 is fixed relative to the gas turbine engine 14. The static exhaust system structure 26 includes a jet pipe 32 that defines a first portion 37 of an outer boundary surface 36 of a primary exhaust system flow path 33 of the system 16 and an inner plug 34 that defines an inner boundary surface 39 of the primary exhaust system flow path 33. The noise management structure 28 includes a moveable exhaust outlet 44 that provides a second portion 38 of the outer boundary surface 36 of the primary exhaust system flow path 33. The moveable exhaust outlet 44 is mounted for movement along the axis 11 to control the variable nozzle throat area 42 of the exhaust system 16 that is formed between the second portion 38 of the outer boundary surface 36 and the inner boundary surface 39. The thrust reverser unit 30 is integrated into the static exhaust system structure 26 and configured to pivot about a pivot axis 13 between a stored arrangement as shown in FIGS. 3-5 and a thrust-reversing arrangement as shown in FIGS. 6 and 7.

For supersonic speed aircrafts, there are several noise regulations limiting the amount of noise produced by the gas turbine engines of the aircrafts. These noise regulations may be dependent of the weight of the aircraft and not the size of the engine. Therefore, a lighter aircraft 10 that is designed to travel at supersonic speeds may need to control the noise produced by the engine 14 at take-off to meet the noise regulations, but also be able to increase the acceleration of the exhaust products 22 at cruise to reach supersonic speeds.

To control the noise produced by the engine 14 at different points of the flight cycle of the aircraft 10, the noise management structure 28 is configured to axially translate relative to the static exhaust system structure 26 between a slid-aft take-off position as shown in FIG. 3, a slid-forward cruise position as shown in FIG. 4, and a slid-aft thrust-reverse position as shown in FIGS. 5-6. In this way, the static exhaust system structure 26 and the noise management structure 28 together provide a reconfigurable exhaust nozzle 40 as shown in FIG. 2. The reconfigurable exhaust nozzle 40 adjusts the variable nozzle throat area 42 of the exhaust system 16 to control noise produced by the gas turbine engine 14 during operation of the gas turbine engine 14 at different points of the flight cycle of the aircraft 10 such as take-off, and landing.

When the moveable exhaust outlet 44 is in the slid-aft take-off position, the second portion 38 of the outer boundary surface 36 and the inner boundary surface 39 provide a convergent nozzle shape with a maximum nozzle throat area 42A as shown in FIG. 3. The maximum nozzle throat area 42A allows for a higher mass flow of exhaust products at a lower speed through the reconfigurable exhaust nozzle 40, which results in lower noise emissions. The lower noise emissions may be helpful for meeting certain noise requirements for ground-level and low-flight level operation such as take-off and landing. As one example, the noise requirements may be related to certain zones around airports such as residential areas. An increased throat area can increase propulsion system efficiency in subsonic or transonic operation where inlet spillage or interactions with other aircraft structures would increase drag.

When the moveable exhaust outlet 44 is in the slid-forward cruise position, the second portion 38 of the outer boundary surface 36 and the inner boundary surface 39 provide a convergent-divergent nozzle shape with a minimum nozzle throat area 42B as shown in FIG. 4. The minimum nozzle throat area 42B allows for flow acceleration of the exhaust products and increased engine efficiency, for example, at aircraft speeds above Mach 1.0. The minimum nozzle throat area 42B may cause the reconfigurable exhaust nozzle 40 to generate noise at greater decibel levels as compared to the maximum nozzle throat area 42A. As such, the moveable exhaust outlet 40 may be in the slid-forward cruise position at higher altitudes and/or outside of restricted noise zones.

When the moveable exhaust outlet 40 is in the slid-aft thrust-reverse position, the moveable exhaust outlet 40 is located axially aft of the slid-aft take-off position to allow the thrust reverser unit 30 to change between the different arrangements as shown in FIGS. 5 and 6. The position of the moveable exhaust outlet 44 exposes a plurality of blocker doors 64 included in the thrust reverser unit 30 to the primary exhaust system flow path 33. In this way, the blocker doors 64 are free to change from the stored arrangement to the thrust-reversing arrangement and engage the inner plug 34 as shown in FIG. 6.

When the thrust reverser unit 30 is in the stored arrangement, the plurality of blocker doors 64 are located within the jet pipe 32 as shown in FIGS. 3 and 4. The blocker doors 64 are stored in the jet pipe 32 so that the blocker doors 64 do not block flow along the primary exhaust system flow path 33.

When the thrust reverser unit 30 is in the thrust-reversing arrangement, the plurality of blocker doors 64 have pivoted relative to the jet pipe 32 about the pivot axis 13 into the primary exhaust system flow path 33. Each blocker door 64 blocks at least some flow along the primary exhaust system flow path 33 so as to direct at least some flow out of the primary exhaust system flow path 33 and create reverse thrust.

The moveable exhaust outlet 44 includes outer and inner shrouds 46, 48, a forward end face 50, and an aft terminal end 52 that is spaced axially aft of the forward end face 50 as shown in FIGS. 3-6. Both the outer shroud 46 and the inner shroud 48 extend circumferentially about the axis 11 to form a full hoop. The inner shroud 48 is spaced radially inward of the outer shroud 46 to define a space 53 therebetween that is sized to receive a portion of the thrust reverser unit 33 when the thrust reverser unit 30 is in the stored arrangement.

The outer and inner shrouds 46, 48 extend axially aft from the forward end face 50 and converge to terminate at the aft terminal end 52 as shown in FIGS. 3-6. An inner surface 38 of the inner shroud 48 forms the second portion 38 of the outer boundary surface 36 of the primary exhaust system flow path 33, while the outer shroud 46 surrounds the inner shroud 48 and thrust reverser unit 30 arranged therebetween.

In the illustrative embodiment, the second portion 38 of the outer boundary surface 36 has a profile with a slope that converges radially inward as it extends axially aft from the forward end face 50 as shown in FIG. 2. The profile of the outer boundary surface 36 creates a larger diameter at the forward end face 50 and a smaller diameter at the aft terminal end 52. The section portion 38 of the outer boundary surface 36 has varying slope along its axial length.

In another embodiment, the outer boundary surface 36 can have a constant slope along its axial length. In some embodiments, the outer boundary surface 36 only converges radially inward from the forward end face 50 to the terminal end 52 without diverging radially outward as the moveable exhaust outlet 44 extends aft.

The moveable exhaust outlet 44 is further shaped to include at least one aperture 54 as shown in FIGS. 5-7. The aperture 54 extends radially through the outer and inner shrouds 46, 48 and circumferentially at least partway about the axis 11. In the slid-aft thrust-reverse position, the at least one aperture 54 is exposed to the primary exhaust system flow path 33. The aperture 54 allows the at least some flow to be directed out of the primary exhaust system flow path 33 by the plurality of blocker doors 64 when the plurality of blocker doors 64 are in the thrust-reversing arrangement.

In the illustrative embodiment, the moveable exhaust outlet 44 is shaped to include two apertures 54 as shown in FIGS. 5 and 6. The apertures 54 extend at least partway about the axis 11 and are spaced apart circumferentially from each other.

Turning again to the noise management structure 28, the noise management structure 28 further includes at least one actuator unit 56 as shown in FIGS. 3-6. The actuator unit 56 is arranged to extend between and interconnect the jet pipe 32 to the moveable exhaust outlet 44. The actuator unit 56 is configured to drive the moveable exhaust outlet 44 between the slid-aft take-off position, the slid-aft thrust-reverse position, and the slid-forward cruise position.

In the illustrative embodiment, the noise management structure 28 includes a plurality of actuator units 56 as shown in FIGS. 5 and 6. The actuator units 56 are spaced apart from each other about the axis 11 and are each arranged to extend between and interconnect the jet pipe 32 to the moveable exhaust outlet 44. The actuator units 56 are configured to drive the moveable exhaust outlet 44 between the slid-aft take-off position, the slid-aft thrust-reverse position, and the slid-forward cruise position.

Each of the actuator units 56 includes an actuator 58, guide track 60, and at least one carriage 61 as shown in FIGS. 3-6. The actuator 58 has a first end 62 that is coupled to the jet pipe 32 of the static exhaust system structure 26 and a second end 63 that is coupled to the outer shroud 46 of the moveable exhaust outlet 44. The guide track 60 is coupled to the static exhaust system structure 26, while the carriage 61 is coupled to the outer shroud 46 of the moveable exhaust outlet 44. The guide track 60 is fixed to the static exhaust system structure 26 to guide the moveable exhaust outlet 44 axially between the different positions. The carriage 61 is mounted on the guide track 60 to translate axially along the guide track 60.

In the illustrative embodiment, the first end 62 and the second end 63 of the actuator 58 are pin joints. In the illustrative embodiment, the second end 63 is coupled to the outer shroud 46 of the moveable exhaust outlet 44. In some embodiments, the second end 63 may be coupled to the forward end face 50 of the moveable exhaust outlet 44. In other embodiments, the second end 63 may be coupled to another portion of the moveable exhaust outlet 44.

In the illustrative embodiment, the moveable exhaust outlet 44 is also configured to axially translate to any one position of a plurality of positions between the slid-aft take-off positon and the slid-forward cruise position. The plurality of positions correspond to different variable nozzle throat areas 42 for the exhaust system 16. The actuators 58 are configured to drive the moveable exhaust outlet 44 between the plurality of positions.

Turning again to the thrust reverser unit 30, the plurality of blocker doors 64 have an outer surface 70 and an inner surface 71 as shown in FIGS. 3-7. Surfaces extend between a first edge 72 and a second edge 74 spaced apart axially from the first edge 72. Each blocker door 64 is coupled to the outer shroud 46 of the moveable exhaust outlet 44 near the first edge 72 and is configured to pivot about the pivot axis 13 relative to the moveable exhaust outlet 44.

When the blocker doors 64 are in the stored arrangement, the blocker doors 64 are at a closed position as shown in FIGS. 3-5. In the closed position, each blocker door 64 is parallel with the axis 11 such that the outer and inner surfaces 70, 71 are parallel with the outer and inner shrouds 46, 48 of the moveable exhaust outlet 44. In the illustrative embodiment, the blocker doors 64 are sized to fill the apertures 54 formed in the moveable exhaust outlet 44 when in the closed position.

When the blocker doors 64 are in the thrust-reversing arrangement, the blocker doors 64 are at an open position as shown in FIGS. 6 and 7. In the open position, the outer and inner surfaces 70, 71 of each blocker door 64 extend at an angle relative to the axis 11. In this way, the blocker door 64 is angled into the flow path 33 so that the outer surface 70 blocks the exhaust products 22 along the primary exhaust system flow path 33. In the illustrative embodiment, the second edge 74 of each blocker door 64 engages the inner boundary surface 39 of the inner plug 34 when the blocker doors 64 are in the open position.

In the illustrative embodiment, the second edge 74 of each blocker doors 64 has a corresponding shape to the inner boundary surface 39 of the inner plug 34. The second edge 74 corresponds to the inner boundary surface 39 of the inner plug 34 so that the blocker door 64 engages the inner plug 34 when the inner plug 34 in the slid-aft thrust-reverse position and the plurality of blocker doors 64 are in the thrust-reversing arrangement.

The thrust reverser unit 30 further includes at least actuator 66, a linkage system 68, and cascade structures 69 as shown in FIGS. 3-6. The actuator 66 has a first end 77 coupled to the moveable exhaust outlet 44 and a second end 78 coupled to the linkage system 68. The actuator 66 is configured to cause the linkage system 68 to drive the plurality of blocker doors 64 between the stored arrangement and the thrust-reversing arrangement. The linkage system 68 arranged to extend between and interconnect the at least one actuator 66 to the plurality of blocker doors 64. The cascade structures 69 are each arranged at least partway into the corresponding aperture 54 of the moveable exhaust outlet 44. The cascade structures 69 are configured to direct the at least some flow directed out of the primary exhaust system flow path 33 by the plurality of blocker doors 64 axially forward to provide reverse thrust.

In the illustrative embodiment, the cascade structures 69 extend at least partway about the axis 11 as shown in FIGS. 5 and 6. The cascade structures 69 are arranged in the aperture 54 and axially align with the outer shroud 46 of the moveable exhaust outlet 44. In this way, the cascade structures 69 are spaced radially outward of the other components of the thrust reverser unit 30.

The linkage system 68 includes a hoop 75 and a plurality of link arms 76 as shown in FIGS. 5-7. The hoop 75 extends circumferentially about the axis 11 to form a full hoop around the inner shroud 48 of the moveable exhaust outlet 44. The hoop 75 is coupled to the second end 78 of the actuator 66 so as to be axially translated by the actuator 66. Each of the plurality of link arms 76 extends between and interconnects the hoop 75 and the corresponding blocker door 64.

Each link arm 76 includes a first end 80 and a second end 81 as shown in FIG. 7. The first end 80 is coupled to the hoop 75. In the illustrative embodiment, the first end 80 is a pin joint configured to pivot relative to the hoop 75. The second end 81 is spaced apart from the first end 80 and coupled to the corresponding blocker door 64 between the first edge 72 and the second edge 74 of the blocker door 64. The second end 81 is also a pin joint and configured to pivot relative to the blocker door 64.

When the thrust reverser unit 30 is in the stored arrangement, the actuators 66 are in a retracted position as shown in FIGS. 3-5. When the actuators 66 are in the retracted position, the linkage system is in a disengaged position such that the link arms 76 are parallel with the blocker doors 64 and the axis 11.

When the thrust reverser unit 30 is in the thrust-reversing arrangement, the actuators 66 are in an extended position as shown in FIGS. 6 and 7. The changing of the actuators 66 from the retracted position to the extended position causes the linkage system to change to an engaged position. In the engaged position, the link arms 76 extend at an angle relative to the axis 11 into the flow path 33.

As the actuator 66 changes from the retracted position to the extended position, the actuator 66 acts as a driving link to translate the hoop 75 of the linkage system 68 axially aft. The axially movement of the hoop 75 causes each link arm to change from the disengaged position to the engaged position. The movement of the link arm between the disengaged position to the engaged position changes the corresponding blocker door 64 from the closed position to the open position.

Turning again to the static exhaust system structure 26, the jet pipe 32 includes an outer nacelle surface 82 and the first portion 37 of the outer boundary surface 36 as shown in FIGS. 3-6. The outer nacelle surface 82 is arranged to extend about the axis 11 and encase the other components of the exhaust system 16. The outer nacelle surface 82 is spaced radially outward of the first portion 37 to define a storage space 84 therebeween. The storage space 84 is sized to receive a portion of the moveable exhaust outlet 44 with the thrust reverser unit 30 in the stored arrangement.

The actuator units 56 of the noise management structure 28 are also positioned in the storage space 84 between the surface 37 and the outer nacelle surface 82 outside of the flow path 33. The actuator units 56 causes a portion of the moveable exhaust outlet 44 to slide axially forward and aft within the storage space 84. By locating the actuator units 56 in the storage space 84, the actuator units 56 are protected from the exhaust products 22 in the flow path 33. Positioning the actuator units 56 outside of the flow path 33 also provides an aerodynamic flow path 33 for the exhaust products 22.

The inner plug 34 includes a plug body 86 and a plurality of support struts 88 as shown in FIGS. 3-6 and 8. The plug body 86 extends axially between a nose 89 and a tail end 90 spaced axially aft of the nose 89. The inner boundary surface 39 of the primary exhaust system flow path 33 is formed by an outer surface of the plug body 86 that extends between the nose 89 and the tail end 90. The plurality of support struts 88 extend radially outward from the plug body 86 to the jet pipe 32 and are spaced circumferentially about the axis 11.

In the illustrative embodiments, the plurality of struts 88 include at least three struts 88 as shown in FIG. 8. The struts 88 are equally spaced apart circumferentially about the axis 11. In some embodiments, inner plug 34 may only include one strut 88. In other embodiments, the plurality of struts 88 may include another number of struts 88 as shown in FIGS. 9 and 10.

In the illustrative embodiment, the plug body 34 includes an internal center body support structure (not shown) that receives loads applied by the exhaust products 22 in the flow path 33. The internal center body support structure transfers the load to the struts 88 and out to the jet pipe 26. The inner boundary surface 39 forms an outer skin 39 that surrounds the internal center body support structure and shields the support structure 88 from the exhaust products 22 in the flow path 33.

Each strut 88 includes an internal support structure (not shown) that couples to the internal center body support structure of the plug body 34 at a first end 91 of the strut 88 and couples to the jet pipe 26 at a second end 92 of the strut 88. The internal support structure is configured to transfer loads applied to the inner plug 34 to the jet pipe 32. An outer skin 93 surrounds the internal support structure and forms an outer surface 93 of the strut 88.

In the illustrative embodiment, the propulsion unit 12 further includes a controller 94 as shown in FIGS. 3 and 4. The controller 94 is coupled to the actuator units 56 of the noise management structure 28 and the actuators 66 of the thrust reverser unit 30. The controller 94 is configured to direct the noise management structure 28 and the thrust reverser unit 30 to change between the different positions and arrangements in response to an input from a user, such as, for example a pilot piloting the aircraft 10. In other embodiments, the controller 94 is configured to direct the noise management structure 28 and the thrust reverser unit 30 to change between the different positions and arrangement based on the flight cycle of the engine 14.

In the illustrative embodiment, the controller 94 is configured to receive a first input that corresponds to a take-off mode. Upon receiving the first input, the controller 94 provides an electronic signal to the actuators 58 to move the moveable exhaust outlet 44 axially aft to the slid-aft take-off position. The controller 94 holds the moveable exhaust outlet 44 in this position until a different input is received.

In the illustrative embodiment, the controller 94 is configured to receive a second input that corresponds to a cruise mode. Upon receiving the second input, the controller 94 provides a signal to the actuators 58 to translate the moveable exhaust outlet 44 axially forward to the slid-forward cruise position. The controller 94 holds the moveable exhaust outlet 44 in this position until a different input is received.

The controller 94 may receive another input to hold and stop the moveable exhaust outlet 44 in one position within the plurality of positions between the slid-aft take-off positon and the slid-forward cruise position, including the take-off position and the cruise position. In some embodiments, it might be advantageous to hold the moveable exhaust outlet 44 relative to the static structure 26 in other axial translation positions within the plurality of positions to tune the reconfigurable exhaust nozzle 40 for a certain point in the engine cycle or an aircraft maneuver. In some embodiments, the controller 94 may be configured to direct the actuator 58 to translate the moveable exhaust outlet 44 at a predetermined speed within the plurality of positions.

In some embodiments, the controller 94 blocks the moveable exhaust outlet 44 from being stopped and held in position in some of the plurality of positions to reduce damage and wear to the reconfigurable exhaust nozzle 40 caused by dynamic responses that occur when the moveable exhaust outlet 44 is in certain positions. In other embodiments, the controller 94 is configured to block the moveable exhaust outlet 44 and hold it in position in any of the plurality of positions. The plurality of positions may include a preset and finite number of positions or may include a continuous infinite number of positions.

In some embodiments, the controller 94 moves the moveable exhaust outlet 44 faster through some of the plurality of positions to reduce damage and wear to the reconfigurable exhaust nozzle 40 caused by dynamic responses that occur when the moveable exhaust outlet 44 is in certain positions. The plurality of positions may result in different shapes of the reconfigurable exhaust nozzle 40 that may be convergent, convergent-divergent, or a transitional shape between convergent and convergent-divergent.

In the illustrative embodiment, the controller 94 is configured to receive a third input that corresponds to a thrust reverse mode. Upon receiving the third input, the controller 94 provides a signal to the actuators 58 to translate the moveable exhaust outlet 44 axially aft to the slid-aft thrust-reverse position. The controller 94 also provides a signal to the actuators 66 of the thrust reverse unit 30 to drive the thrust reverser unit 30 from the stored arrangement to the thrust-reversing arrangement. The controller 94 holds the moveable exhaust outlet 44 and the blocker doors 64 in this position/arrangement until a different input is received.

A method of using the propulsion unit 12 may include several steps. At take-off, the controller 94 receives the first input that corresponds to the take-off mode. The controller 94 then directs actuators 58 to the translate the moveable exhaust outlet 44 axially aft along the axis 11 to the slid-aft take-off position to provide the maximum nozzle throat area 42A of the reconfigurable exhaust nozzle 40. The controller 94 directs the actuators 58 to hold the moveable exhaust outlet 44 in the slid-aft take-off position until a different input is received.

After the aircraft 10 is at the desired altitude, the controller 94 may then receive the second input that corresponds to the cruise mode. The controller 94 then directs the actuators 58 to translate the moveable exhaust outlet 44 axially forward along the axis 11 to the slid-forward cruise position to provide the minimum nozzle throat area 42B of the reconfigurable exhaust nozzle 40. The controller 94 directs the actuators 58 to hold the moveable exhaust outlet 44 in the slid-forward cruise position until a different input is received.

Between the take-off and cruise modes, the controller 94 may receive another input that causes the controller 94 to direct the actuators 58 to translate the moveable exhaust outlet 44 to another position from a plurality of positions between the take-off and cruise positions. The controller 94 may direct the actuators 58 to hold the moveable exhaust outlet 44 in this position until a different input is received.

Upon landing, the controller 94 may receive the third input that corresponds to a thrust reverse mode. The controller 94 then directs the moveable exhaust outlet 44 to move translate along the axis relative to the static structure 26 to the slid-forward thrust-reverse position. The controller 94 directs actuators 66 to drive the blocker doors 64 from the stored arrangement to the thrust-reversing arrangement when the moveable exhaust outlet 44 is in the slid-aft thrust-reverser position. The controller 94 directs the moveable exhaust outlet 44 and the blocker doors 64 to hold in this position/arrangement until a different input is received.

Another embodiment of another inner plug 234 in accordance with the present disclosure is shown in FIG. 9. The inner plug 234 is substantially similar to the inner plug 34 shown in FIGS. 2-6 and 8 and described herein. Accordingly, similar reference numbers in the 200 series indicate features that are common between the inner plug 34 and the inner plug 234. The description of the inner plug 34 is incorporated by reference to apply to the inner plug 234, except in instances when it conflicts with the specific description and the drawings of the inner plug 234.

The inner plug 234 includes a plug body 286 and two support struts 288 as shown in FIG. 9. The plug body 286 is arranged circumferentially about the axis 11 between a nose 289 and a tail end 290 spaced axially aft of the nose 289. An outer surface 239 of the plug body 286 defines the inner boundary surface 239. The plurality of support struts 288 extend radially outward from the plug body 286 on opposite sides of the plug body 286.

Another embodiment of another inner plug 334 in accordance with the present disclosure is shown in FIG. 10. The inner plug 334 is substantially similar to the inner plug 34 shown in FIGS. 2-6 and 8 and described herein. Accordingly, similar reference numbers in the 300 series indicate features that are common between the inner plug 34 and the inner plug 334. The description of the inner plug 34 is incorporated by reference to apply to the inner plug 334, except in instances when it conflicts with the specific description and the drawings of the inner plug 334.

The inner plug 334 includes a plug body 386 and four support struts 388 as shown in FIG. 9. The plug body 386 is arranged circumferentially about the axis 11 between a nose 389 and a tail end 390 spaced axially aft of the nose 389. An outer surface 339 of the plug body 386 defines the inner boundary surface 339. The plurality of support struts 388 extend radially outward from the plug body 386 and are spaced apart circumferentially about the plug body 386.

The present disclosure related to aircrafts 10 that support supersonic flight. The propulsion unit 12 for the aircraft 10 may include the exhaust system 16 that has an integral thrust reverser unit 30 and the ability to vary the variable nozzle throat area. The integrated thrust reverser unit 30 with the reconfigurable exhaust nozzle 24 may increase the efficiency of the propulsion unit 12.

The exhaust system 16 includes the static exhaust system structure 26 and the noise management structure 28 with moveable exhaust outlet 44 that together provide the reconfigurable exhaust nozzle 40. The reconfigurable exhaust nozzle 40 has a broad efficient peak across the operating range. The shape of the outer and inner boundary surfaces 36, 39 along with the variable nozzle throat area 42, provides efficient operation at cruise and quiet operation during take-off.

To control the variable nozzle throat area 42, the moveable exhaust outlet 44 is translated forward and aft to provide a large or maximum nozzle throat area 42A for take-off as shown in FIG. 3 and a minimum nozzle throat area 42B for cruise as shown in FIG. 4. The blocker doors 64 of the thrust reverser unit 30 are integrated so that the thrust reverser unit 30 is stored in the static exhaust system structure 26.

The maximum nozzle throat area 42A may be varied by supporting the moveable exhaust outlet 44 on a track system. The track system or actuator unit 56 includes an actuator 58 that moves the moveable exhaust outlet 44 forward and aft along the guide track 60. The guide track 60 is anchored to the structure 28 so that the loads are transferred to the frame of the aircraft 10.

The actuator unit 56 is located toward a forward end face 50 of the moveable exhaust outlet 44 and positioned within the structure 28 to take advantage of the cooler environment during operation of the engine 14. The actuator units 56 utilize actuators 58 and a guide rail system 60 with bearings 61 located between the surface 37 and outer nacelle surface 82 (cooler environment for hydraulic or electric actuators) for smooth, long life operation.

This inner structure or plug 34 with the moveable exhaust outlet 44 provide a physical variation in exhaust gas throat area and exit area that is controllable and repeatable. This variation may provide an environment for efficient engine operation. The shaping of the struts 88, 288, 388, the plug body 34, 234, 334, the structure 26 provides a flow path 33 that maximizes performance at take-off, subsonic cruise and supersonic cruise. The thrust reverse unit 30 operates with the reconfigurable exhaust nozzle 40 and provides the capability to land the aircraft on short runways making the entire unit a highly integrated exhaust system 16.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A propulsion unit for an aircraft, the propulsion unit comprising
a gas turbine engine arranged along an axis including an engine core configured to discharge a core flow and a fan configured to discharge a bypass flow, and
an exhaust system coupled to the gas turbine engine to receive a mixed flow comprising the bypass flow and the core flow from the gas turbine engine, the exhaust system including (i) a static exhaust system structure fixed relative to the gas turbine engine, the static exhaust system structure includes a jet pipe arranged around the axis to provide a first portion of an outer boundary surface of a primary exhaust system flow path and an inner plug that defines an inner boundary surface of the primary exhaust system flow path, (ii) a noise management structure including a moveable exhaust outlet that is mounted for movement along the axis and that provides a second portion of the outer boundary surface of the primary exhaust system flow path, wherein the noise management structure is configured to axially translate relative to the static exhaust system structure between a slid-aft take-off position, a slid-aft thrust-reverse position, and a slid-forward cruise position to provide a reconfigurable exhaust nozzle that adjusts a variable nozzle throat area of the exhaust system to control noise produced by the gas turbine engine during operation of the gas turbine engine, and (iii) a thrust reverser unit including a plurality of blocker doors configured to pivot relative to the jet pipe about a pivot axis between a stored arrangement, in which the plurality of blocker doors are located within the jet pipe and do not block the mixed flow along the primary exhaust system flow path and a thrust-reversing arrangement, in which each blocker door blocks at least some of the mixed flow along the primary exhaust system flow path so as to direct the at least some of the mixed flow out of the primary exhaust system flow path and create reverse thrust,
wherein the slid-aft take-off position of the moveable exhaust outlet provides a convergent nozzle shape with a maximum nozzle throat area between the outer boundary surface of the jet pipe and the inner boundary surface of the inner plug to produce subsonic flow conditions, and
wherein the noise management structure is configured to translate axially forward from the slid-aft take-off position to the slid-forward cruise position so that the slid-forward cruise position of the moveable exhaust nozzle provides a convergent-divergent nozzle shape with a minimum nozzle throat area between the outer boundary surface of the jet pipe and the inner boundary surface of the inner plug that is less than the maximum nozzle throat area to produce supersonic flow conditions.

2. The propulsion unit of claim 1, wherein the slid-aft thrust-reverse position is axially aft of the slid-aft take-off position such that at least one aperture formed in the moveable exhaust outlet is exposed to the primary exhaust system flow path to allow the at least some of the mixed flow to be directed out of the primary exhaust system flow path by the plurality of blocker doors when the plurality of blocker doors are in the thrust-reversing arrangement.

3. The propulsion unit of claim 1, wherein the moveable exhaust outlet is configured to translate axially between a plurality of positions between the slid-aft take-off position and the slid-forward cruise position.

4. The propulsion unit of claim 1, wherein the noise management structure further includes a plurality of actuator units arranged to extend between the jet pipe of the static exhaust system structure and the moveable exhaust outlet to drive the moveable exhaust outlet between the slid-aft take-off position, the slid-aft thrust-reverse position, and the slid-forward cruise position.

5. The propulsion unit of claim 1, wherein the thrust reverser unit further includes at least one actuator configured to drive the plurality of blocker doors between the stored arrangement and the thrust-reversing arrangement and a linkage system arranged to extend between and interconnect the at least one actuator to the plurality of blocker doors.

6. The propulsion unit of claim 5, wherein the moveable exhaust outlet is shaped to include at least one aperture that extends at least circumferentially partway about the axis and is open to the primary exhaust system flow path when the moveable exhaust outlet is in the slid-aft thrust-reverse position so as to allow the at least some of the mixed flow to be directed out of the primary exhaust system flow path by the plurality of blocker doors when the plurality of blocker doors are in the thrust-reversing arrangement.

7. The propulsion unit of claim 6, wherein the thrust reverser unit further includes a cascade structure arranged in the at least one aperture of the moveable exhaust outlet and configured to direct the at least some of the mixed flow directed out of the primary exhaust system flow path by the plurality of blocker doors axially forward to provide reverse thrust.

8. The propulsion unit of claim 1, wherein the plurality of blocker doors have a corresponding shape to the inner boundary surface of the inner plug at a location radially inward of the plurality of blocker doors when the inner plug in the slid-aft thrust-reverse position and the plurality of blocker doors are in the thrust-reversing arrangement.

9. An exhaust system for use with a gas turbine engine, the exhaust system comprising
a static exhaust system structure that defines a primary exhaust system flow path of the exhaust system, the static exhaust system structure including a jet pipe arranged around an axis to provide an outer boundary surface of the primary exhaust system flow path and an inner plug that defines an inner boundary surface of the primary exhaust system flow path,
a noise management structure including a moveable exhaust outlet that is mounted for movement along the axis and provides a portion of the outer boundary surface of the primary exhaust system flow path, wherein the noise management structure is configured to axially translate relative to the static exhaust system structure between a slid-aft take-off position, a slid-aft thrust-reverse position, and a slid-forward cruise position to provide a reconfigurable exhaust nozzle that adjusts a variable nozzle throat area of the exhaust system to vary noise produced by the gas turbine engine during operation of the gas turbine engine, and a thrust reverser unit including a plurality of blocker doors configured to pivot relative to the jet pipe about a pivot axis between a closed position in which the plurality of blocker doors are located within an aperture formed in the moveable exhaust outlet to close the aperture formed in the moveable exhaust outlet and an open position in which each blocker door extends into the primary exhaust system flow path and blocks at least some flow along the primary exhaust system flow path so as to direct at least some flow out of the primary exhaust system flow path through the aperture formed in the moveable exhaust outlet and create reverse thrust, wherein the slid-aft take-off position of the moveable exhaust outlet provides a convergent nozzle shape between the outer boundary surface of the jet pipe and the inner boundary surface of the inner plug to reduce noise produced by the gas turbine engine during operation of the gas turbine engine at one of take-off or landing, wherein the slid-forward cruise position of the moveable exhaust outlet provides a convergent-divergent nozzle shape between the outer boundary surface of the jet pipe and the inner boundary surface of the inner plug to increase acceleration of the flow, and wherein the slid-forward cruise position is axially forward of the slid-aft take-off position.

10. The exhaust system of claim 9, wherein the slid-aft thrust-reverse position is axially aft of the slid-aft take-off position such that the aperture formed in the moveable exhaust outlet is exposed to the primary exhaust system flow path to allow the at least some flow to be directed out of the primary exhaust system flow path by the plurality of blocker doors.

11. The exhaust system of claim 10, wherein the slid-aft take-off position of the moveable exhaust outlet provides a maximum nozzle throat area between the outer boundary surface of the jet pipe and the inner boundary surface of the inner plug.

12. The exhaust system of claim 11, wherein the slid-forward cruise position of the moveable exhaust outlet provides a minimum nozzle throat area between the outer boundary surface of the jet pipe and the inner boundary surface of the inner plug that is less than the maximum nozzle throat area.

13. The exhaust system of claim 9, wherein the noise management structure further includes a plurality of actuator units arranged to extend between the jet pipe of the static exhaust system structure and the moveable exhaust outlet to drive the moveable exhaust outlet between the slid-aft take-off position, the slid-aft thrust-reverse position, and the slid-forward cruise position.

14. The exhaust system of claim 9, wherein thrust reverser unit further includes at least one actuator configured to drive the plurality of blocker doors between the open position and the closed position and a linkage system arranged to extend between and interconnect the at least one actuator to the plurality of blocker doors.

15. The exhaust system of claim 14, wherein the moveable exhaust outlet is shaped to include at least one aperture that extends at least circumferentially partway about the axis and is open to the primary exhaust system flow path when the moveable exhaust outlet is in the slid-aft thrust-reverse position so as to allow the at least some flow to be directed out of the primary exhaust system flow path by the plurality of blocker doors when the plurality of blocker doors are in the open position.

16. The exhaust system of claim 15, wherein the thrust reverser unit further includes a cascade structure arranged in the at least one aperture of the moveable exhaust outlet and configured to direct the at least some flow directed out of the primary exhaust system flow path by the plurality of blocker doors axially forward to provide reverse thrust.

17. A method comprising: providing an exhaust system for use with a gas turbine engine, the exhaust system comprising a static exhaust system structure that defines a primary exhaust system flow path of the exhaust system, the static exhaust system structure including a jet pipe arranged around an axis to provide an outer boundary surface of the primary exhaust system flow path and an inner plug that defines an inner boundary surface of the primary exhaust system flow path, a noise management structure including a moveable exhaust outlet that is mounted for movement along the axis and provides a portion of the outer boundary surface of the primary exhaust system flow path, wherein the noise management structure is configured to axially translate relative to the static exhaust system structure between a slid-aft take-off position, a slid-aft thrust-reverse position, and a slid-forward cruise position to provide a reconfigurable exhaust nozzle that adjusts a variable nozzle throat area of the exhaust system to vary noise produced by the gas turbine engine during operation of the gas turbine engine, and a thrust reverser unit including a plurality of blocker doors configured to pivot relative to the jet pipe about a pivot axis between a closed position in which the plurality of blocker doors are located within an aperture formed in the moveable exhaust outlet to close the aperture formed in the moveable exhaust outlet and an open position in which each blocker door extends into the primary exhaust system flow path and blocks at least some flow along the primary exhaust system flow path so as to direct at least some flow out of the primary exhaust system flow path through the aperture formed in the moveable exhaust outlet and create reverser thrust, wherein the slid-aft take-off position of the moveable exhaust outlet provides a convergent nozzle shape between the outer boundary surface of the jet pipe and the inner boundary surface of the inner plug to reduce noise produced by the gas turbine engine during operation of the gas turbine engine at one of take-off or landing, wherein the slid-forward cruise position of the moveable exhaust outlet provides a convergent-divergent nozzle shape between the outer boundary surface of the jet pipe and the inner boundary surface of the inner plug to increase acceleration of the flow, and wherein the slid-forward cruise position is axially forward of the slid-aft take-off position, directing the moveable exhaust outlet to translate axially along the axis relative to the static exhaust system structure to the slid-aft take-off position to provide the convergent nozzle shape with a maximum nozzle throat area of the reconfigurable exhaust nozzle, directing the moveable exhaust outlet to translate axially along the axis relative to the static exhaust system structure to the slid-forward cruise position to provide a convergent-divergent nozzle shape with a minimum nozzle throat area of the reconfigurable exhaust nozzle, directing the moveable exhaust outlet to translate axially along the axis relative to the static exhaust system structure to the slid-aft thrust-reverse position, and directing the plurality of blocker doors of the thrust reverser unit to move from a stored arrangement in which the plurality of blocker doors are located within the aperture and a thrust-reversing arrangement in which each blocker door blocks the at least some flow along the primary exhaust system flow path and creates reverse thrust.

18. The method of claim 17, further comprising providing a controller coupled to the exhaust system, wherein the controller is configured to direct the moveable exhaust outlet to translate axially along the axis to the slid-aft take-off position in response to a first input, the controller is configured to direct the moveable exhaust outlet to translate axially along the axis to the slid-forward cruise position in response to a second input, and the controller is configured to direct the moveable exhaust outlet to translate axially along the axis to the slid-aft thrust-reverse position and the plurality of blocker doors to pivot about the pivot axis to the thrust-reversing arrangement in response to a third input.

* * * * *